United States Patent
Moriyama et al.

(10) Patent No.: US 6,481,788 B1
(45) Date of Patent: Nov. 19, 2002

(54) UPPER BODY STRUCTURE FOR A VEHICLE

(75) Inventors: Naomune Moriyama, Hiroshima (JP); Kazurou Hanaki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/710,869

(22) Filed: Nov. 14, 2000

(30) Foreign Application Priority Data

Nov. 17, 1999  (JP) ............................................ 11-326870

(51) Int. Cl.⁷ .................................................. B60J 7/00
(52) U.S. Cl. .................................. 296/216.07; 296/219
(58) Field of Search ................. 296/219, 216.06–216.09

(56) References Cited

U.S. PATENT DOCUMENTS

| 1,703,395 A | * | 2/1929 | House ..................... 296/219 X |
| 1,883,739 A | * | 10/1932 | Ford .......................... 296/219 |
| 4,838,607 A | * | 6/1989 | Mizuma et al. ............. 296/219 |
| 5,671,968 A | * | 9/1997 | Masuda et al. ............. 296/188 |

FOREIGN PATENT DOCUMENTS

| CH | 67047 | * | 12/1913 | ................. 296/219 |
| FR | 599135 | * | 1/1926 | ................. 296/219 |
| FR | 1534856 | * | 6/1968 | ................. 296/219 |
| GB | 298335 | * | 10/1928 | ................. 296/219 |
| JP | 88613 | * | 4/1987 | ................. 296/219 |
| JP | 06-003716 | | 1/1994 | |

* cited by examiner

Primary Examiner—Dennis H. Pedder
(74) Attorney, Agent, or Firm—Nixon Peabody LLP; Donald R. Studebaker

(57) ABSTRACT

An upper body structure with greater strength and rigidity to withstand side loads even when a large roof opening is formed in the roof. Ribs in a soft canvas cover for the roof opening are also hidden from view. A roof opening is formed throughout substantially the entire length of the roof. The roof opening can be closed by a soft cover made from canvas or other material and a framework having plurality of rib. A frame is installed to the roof so as to frame the roof opening. The frame has a reinforcing cross member connecting the long right and left side of the frame. The reinforcing cross member is located in the longitudinal direction of the vehicle substantially at the center pillars. The frame and center pillars are conjoined by reinforcement. When cover is closed over roof opening, at least one of the plural ribs overlaps and is hidden by reinforcing cross member.

3 Claims, 10 Drawing Sheets

UPPER BODY STRUCTURE FOR A VEHICLE

BACKGROUND OF THE INVENTION

1. Field of the Invention

The present invention relates to an upper body structure of a vehicle.

2. Description of Related Art

Some motor vehicles, typically automobiles, have an opening formed in the roof (a roof opening) and a cover member that can be operated to open and close the roof opening as desired. The roof opening is typically rectangular with the long side substantially aligned with the long side of the vehicle, i.e., front to back. One type of such automobiles is called as canvas-top type of which the cover member is canvas type, wherein the cover is a retractable soft top typically comprising a soft canvas material and framework (ribs) enabling the cover to be opened and closed in a bellows-like fashion along the longitudinal axis of the vehicle and roof opening. (See Japanese Utility Model Laid-open Publication No. 6-3716.)

This prior art discloses a frame structure provided to a roof of an automobile having the canvas type cover member, wherein guide members are formed integrally to side edge portions of the frame and, under the guide members, a sub-frame is fixed to the side edge portions of the frame. The sub-frame supports a top seal member disposed under side portions of the roof and the side edge portions of the frame. This frame structure is employed to position the guide members relative to the frame with high accuracy and to eliminate an adjustment in assembly work. Also, according to the frame structure, high sealing performance between the roof and the cover member can be achieved.

One problem with such a roof opening is that it is difficult to assure sufficient strength and rigidity in the vehicle body, particularly when the opening is large. More specifically, the roof is connected to the side bodies of the vehicle by way of the intervening side pillars, and plays a structural role contributing to the strength and rigidity of the vehicle body. However, when the size of the roof opening is large, the strength, that is, the rigidity, of the roof itself decreases. This creates the problem of how to assure sufficient strength, and particularly how to assure sufficient rigidity, against side loads.

Furthermore, when the roof opening is formed with the longitudinal axis thereof oriented in the front-to-back (longitudinal) direction of the vehicle, a canvas-like cover is used as described above, and the cover is extended to close the roof opening, the framework (ribs), or more specifically the contours thereof, can be seen from inside the passenger cabin. Some means of improving the appearance is thus desirable.

The invention addresses these problems, and has as its first object to provide an upper body structure for a vehicle such as an automobile that is capable of sufficiently withstanding side loads even when a roof opening is formed.

A second object of the invention is to provide an upper body structure for a vehicle such as an automobile that makes the framework (contours thereof) as least visible as possible from inside the passenger cabin when the cover member for the roof opening is a canvas-like member.

SUMMARY OF THE INVENTION

In order to achieve the above-noted objects, according to the present invention, there is provided an upper body structure for a vehicle having in the vehicle roof a roof opening that can be opened and closed by a cover member, comprising: a frame member disposed to the roof so as to frame the roof opening and support the cover member, the frame member comprising a reinforcing cross member extending widthwise to the vehicle body and interconnecting right and left frame side members, which are longitudinal to the vehicle body.

In this case, the upper body of the vehicle, especially the roof is reinforced by means of the reinforcing cross member of the roof frame, creating a construction that is particularly strong with respect to side loads. That is, the reinforcing cross member creates a construction that is even stronger with respect to side loads.

Also, In the above aspect of the present invention, it is more preferable that the frame member and a center pillar of the vehicle body are conjoined by a reinforcement. By employing this feature, the reinforcement increases the bond strength between the center pillar and the frame, creating a construction that is even stronger with respect to side loads.

Furthermore, it is more preferable that the center pillar is located in the longitudinal direction of the vehicle body between the front and back ends of the roof opening and the reinforcing cross member is located substantially at the location of the center pillar in the longitudinal direction of the vehicle body. This creates a construction that is even stronger with respect to side loads.

Furthermore, it is more preferable that the cover member is of canvas type which is a soft top cover comprising a cover material and ribs enabling the cover member to expand and contract in the longitudinal direction of the vehicle body. A soft canvas top is provided as the cover.

Furthermore, it is more preferable that at least one of said ribs positioned in the longitudinal direction of the vehicle body so as to overlap the reinforcing cross member when the roof opening is completely closed by the cover member. In this case, the reinforcing cross member hides one or more ribs in the framework supporting the cover when the roof opening is closed by the cover. Fewer ribs are thus visible from inside the passenger cabin, and the appearance is improved.

Furthermore, it is more preferable that the cover material is weakly transparent to visible light. In this case, the material of the cover allows light to enter the passenger cabin even when the roof opening is closed by the cover. Passengers can thus enjoy a pleasantly brighter interior.

Other objects and attainments together with a fuller understanding of the invention will become apparent and appreciated by referring to the following description and claims taken in conjunction with the accompanying drawings.

DESCRIPTION OF THE PREFERRED EMBODIMENTS

The preferred embodiments of the present invention are described below with reference to the accompanying figures. First, the outline of the present invention will be explained with reference to FIGS. 1 to 3.

Figure 1:
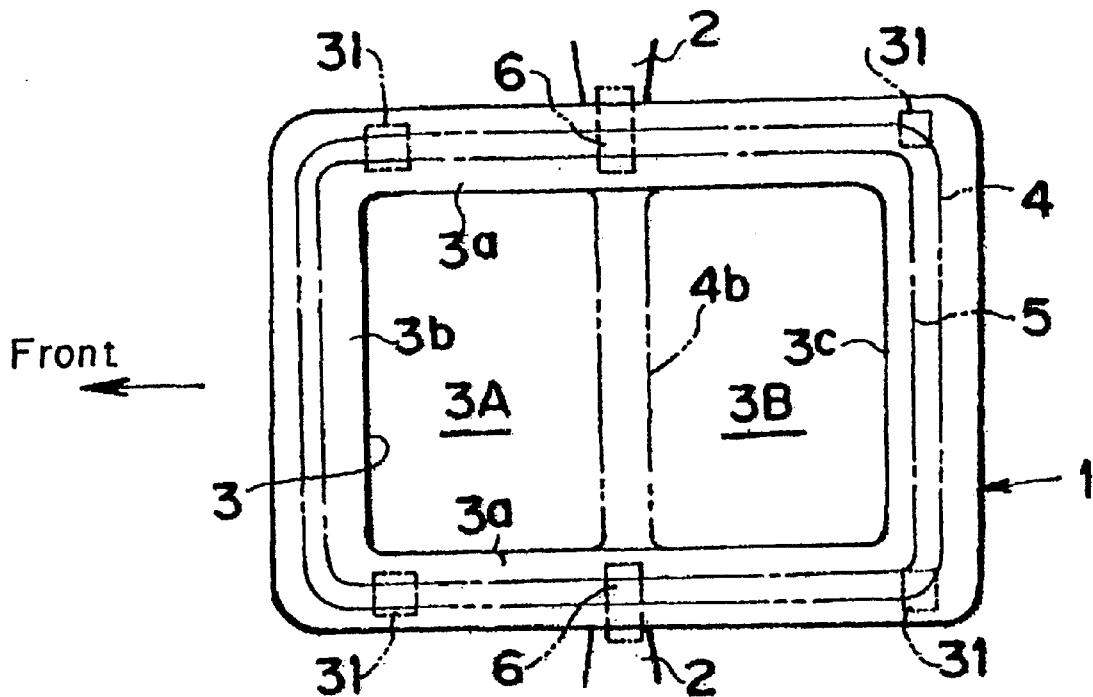
FIG. 1 is a simplified top view of a roof of a vehicle to which the present invention is applied.

Shown in FIG. 1 are the vehicle roof 1 as seen from above, and center pillar 2 (B pillar in the preferred embodiment). A roof opening 3 formed in this roof 1 covers substantially the entire roof area, that is, extends across substantially the entire width and substantially the entire length of the roof.

Figure 2:
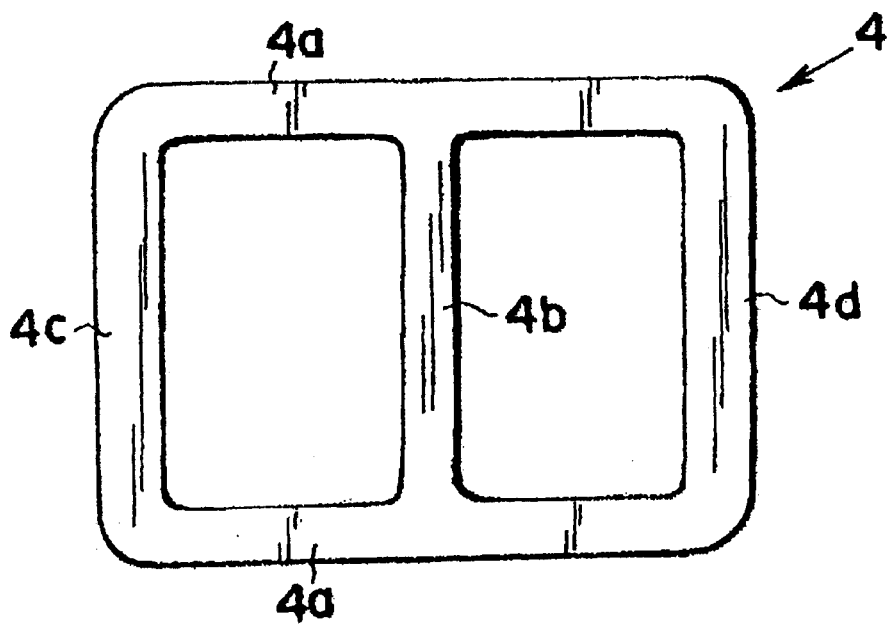
FIG. 2 is a simplified top view of a frame member mounted to the roof shown in FIG. 1.

FIG. 2 shows the frame 4. This frame 4 is shaped to frame the roof opening 3 and has a reinforcing cross member 4b (reinforcing cross member) connecting right and left side members 4a, which project widthwise to and extend in the longitudinal direction of the vehicle. More specifically, frame 4 rings the roof opening 3 with right and left side members 4a, front cross member 4c extending widthwise to the vehicle body and connecting the front ends of the right and left side members 4a extending in the longitudinal direction of the vehicle, and rear cross member 4d extending widthwise to the vehicle body and connecting the back ends of the right and left side members 4a extending in the longitudinal direction of the vehicle. The reinforcing cross member 4b also connects the right and left side members 4a at the longitudinal middle.

When frame 4 is installed to the roof 1, it is positioned as indicated by the double-dot dash line in FIG. 1. That is, the right and left side members 4a follow the right and left edge parts 3a along the long (front to back) side of the roof opening 3, the front cross member 4c of frame 4 follows the front edge part 3b of roof opening 3, and the rear cross member 4d follows the rear edge part 3c of roof opening 3.

The reinforcing cross member 4b is positioned relative to the longitudinal axis of the vehicle so that it substantially matches, and preferably completely matches as in this preferred embodiment, the center pillars 2. When frame 4 is installed to roof 1, reinforcing cross member 4b thus actually divides the roof opening 3 into a front opening 3A and a rear opening 3B.

It should be noted that the opening enclosed by the four sides 4a, 4c, and 4d of frame 4 is slightly smaller than roof opening 3, and the outside edges of these four sides 4a, 4c, and 4d are sufficiently larger than roof opening 3.

Figure 3:
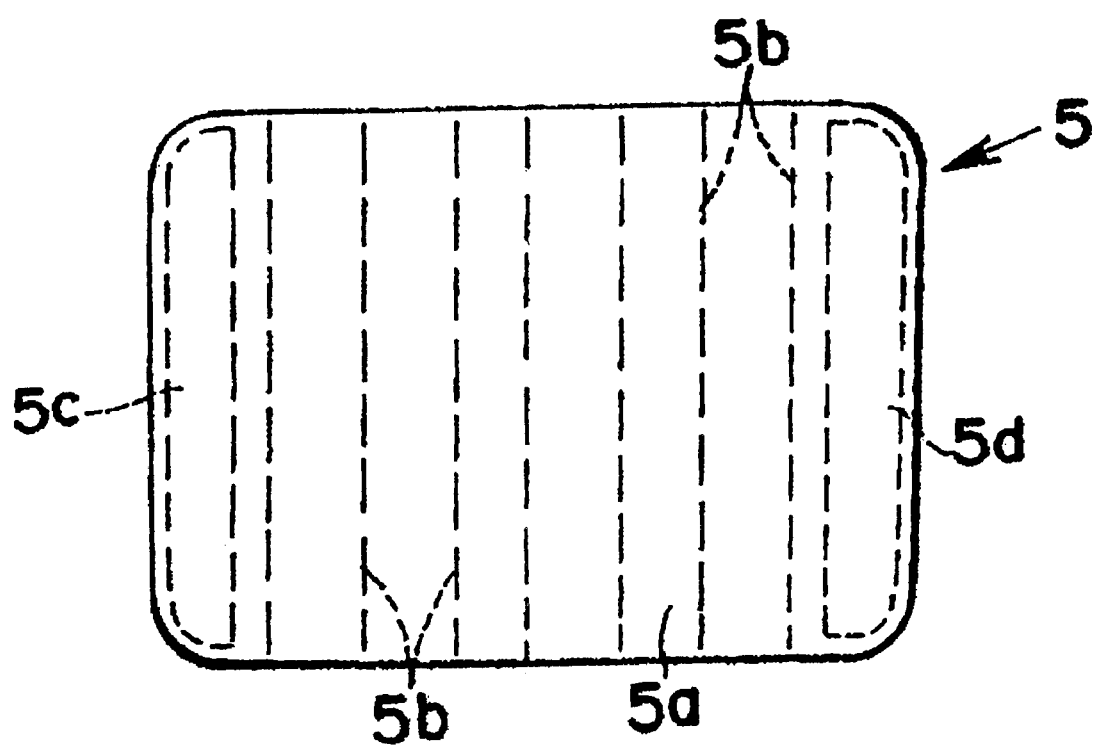
FIG. 3 is a simplified top view of a cover member installed to the roof shown in FIG. 1.

FIG. 3 shows the cover 5. In this preferred embodiment of the present invention, cover 5 is of canvas type which is a soft top made of a textile such as canvas 5b, ribs 5b, front hard member 5c, and rear hard member 5d. Note that hard members 5c and 5d are typically made from hardboard. Note that cover 5 is shown when in the closed position, that is fully expanded, in FIG. 3. The ribs 5b extend crosswise (widthwise) to the vehicle with a specific gap therebetween in the longitudinal direction, and are fixed to the canvas 5a by means of a mounting sheet, for example. The front hard member 5c and rear hard member 5d are fixed to the canvas 5a in the same way.

The location of cover 5 when mounted to roof 1 by way of intervening frame 4 is indicated by the dot-dash line in FIG. 1. Cover 5 is installed with only the back end thereof fastened to frame 4, for example, so that the front end can be extended in the longitudinal direction of the vehicle manually or by means of a motor. Roof opening 3 is closed (completely closed) when the cover 5 is fully extended, and is open (completely open) when cover 5 is fully retracted. Canvas 5a is preferably made from a translucent material capable of passing a certain amount, preferably between approximately 20% and 50%, of visible light, such as sunlight, so that when roof opening 3 is completely closed by cover 5, sunlight can still pass canvas 5a into the passenger cabin.

Though not shown in FIG. 1, when cover 5 is completely closed, at least one of the ribs 5b is located at and hidden by the reinforcing cross member 4b when viewed from inside the passenger cabin. As a result, the number of ribs 5b (contours thereof) visible from inside the passenger cabin is reduced by the number overlapping reinforcing cross member 4b.

Center pillar 2 and reinforcing cross member 4b of frame 4 are connected by means of reinforcement 6. The right and left center pillars 2 and reinforcing cross member 4b form a type of roll bar connecting the right and left side portions of the vehicle body at matching longitudinal positions of the vehicle, thus forming a structure that is strong with respect to side loads. The above-noted reinforcements 6 further enhance this roll bar structure, and make the structure even stronger with respect to side loads.

Figure 4:
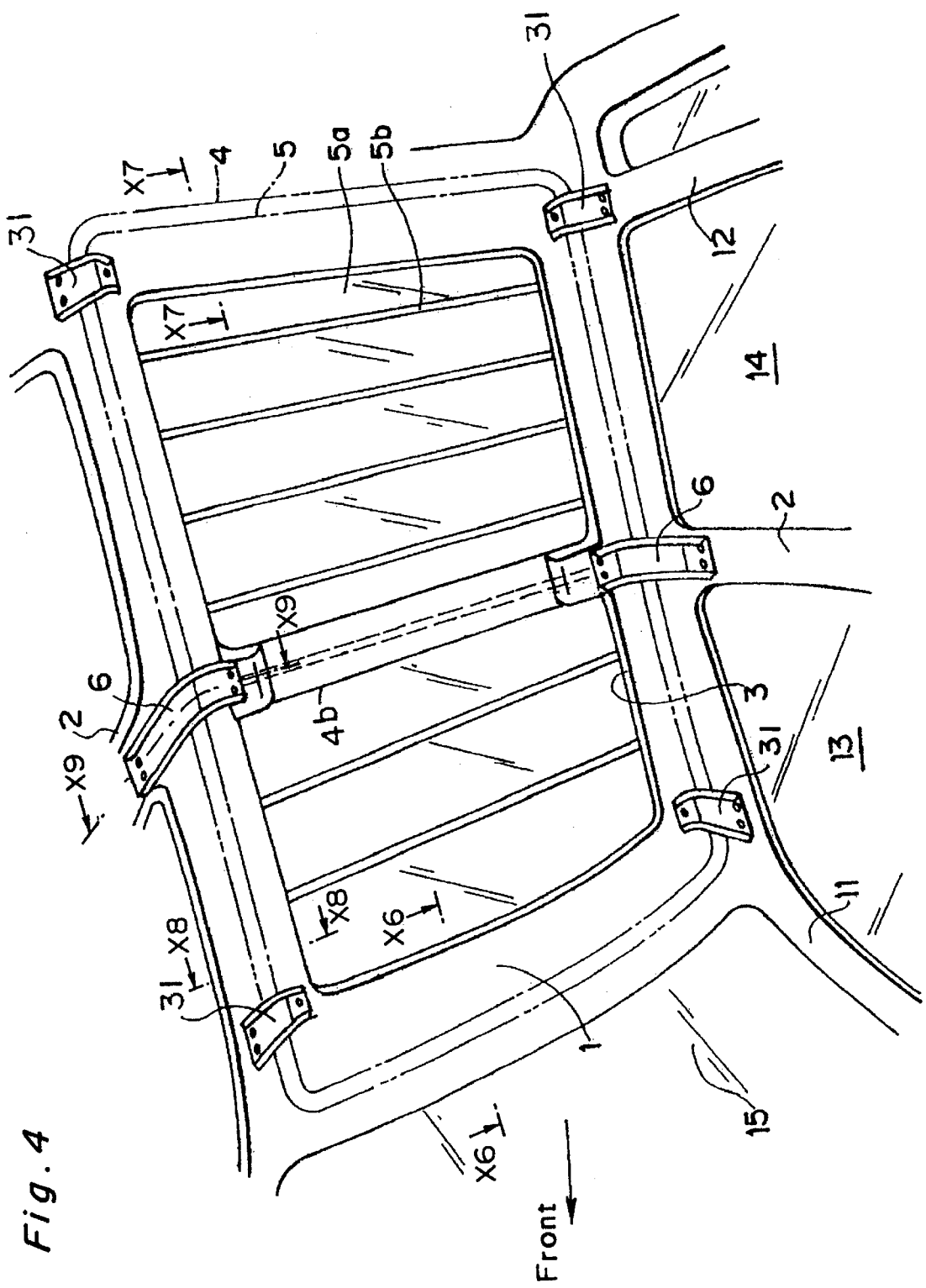
FIG. 4 is an oblique view from inside the passenger cabin of a vehicle in which the present invention installed, with the interior trim removed.
Figure 5:
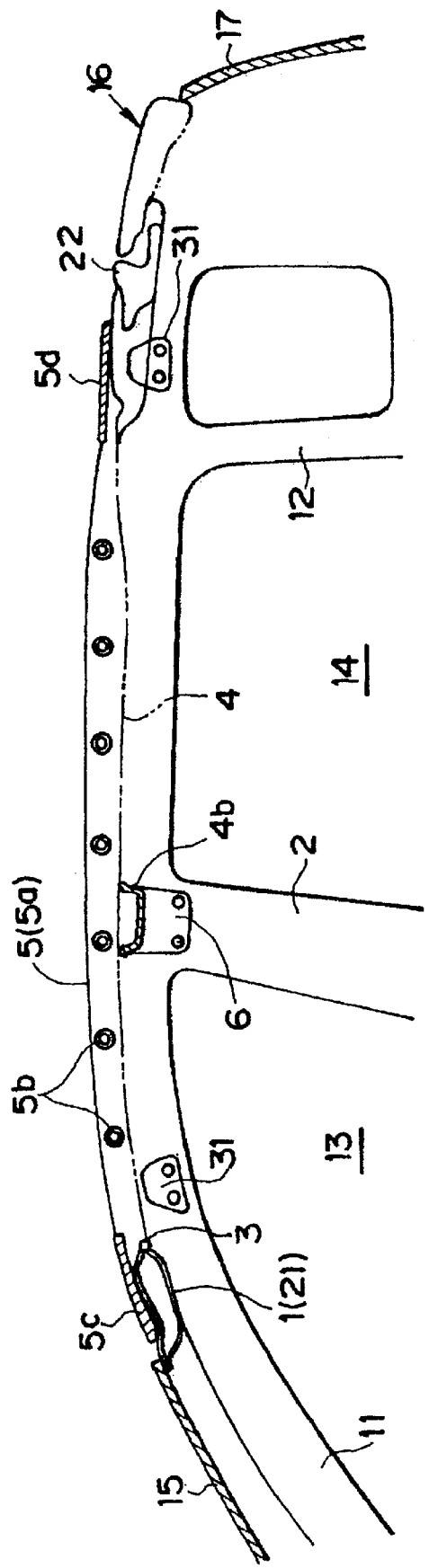
FIG. 5 is a partial section view from the side of the vehicle shown in FIG. 4, clearly showing the relationship between the longitudinal positions of the cover, reinforcing member, and reinforcement.
Figure 6:
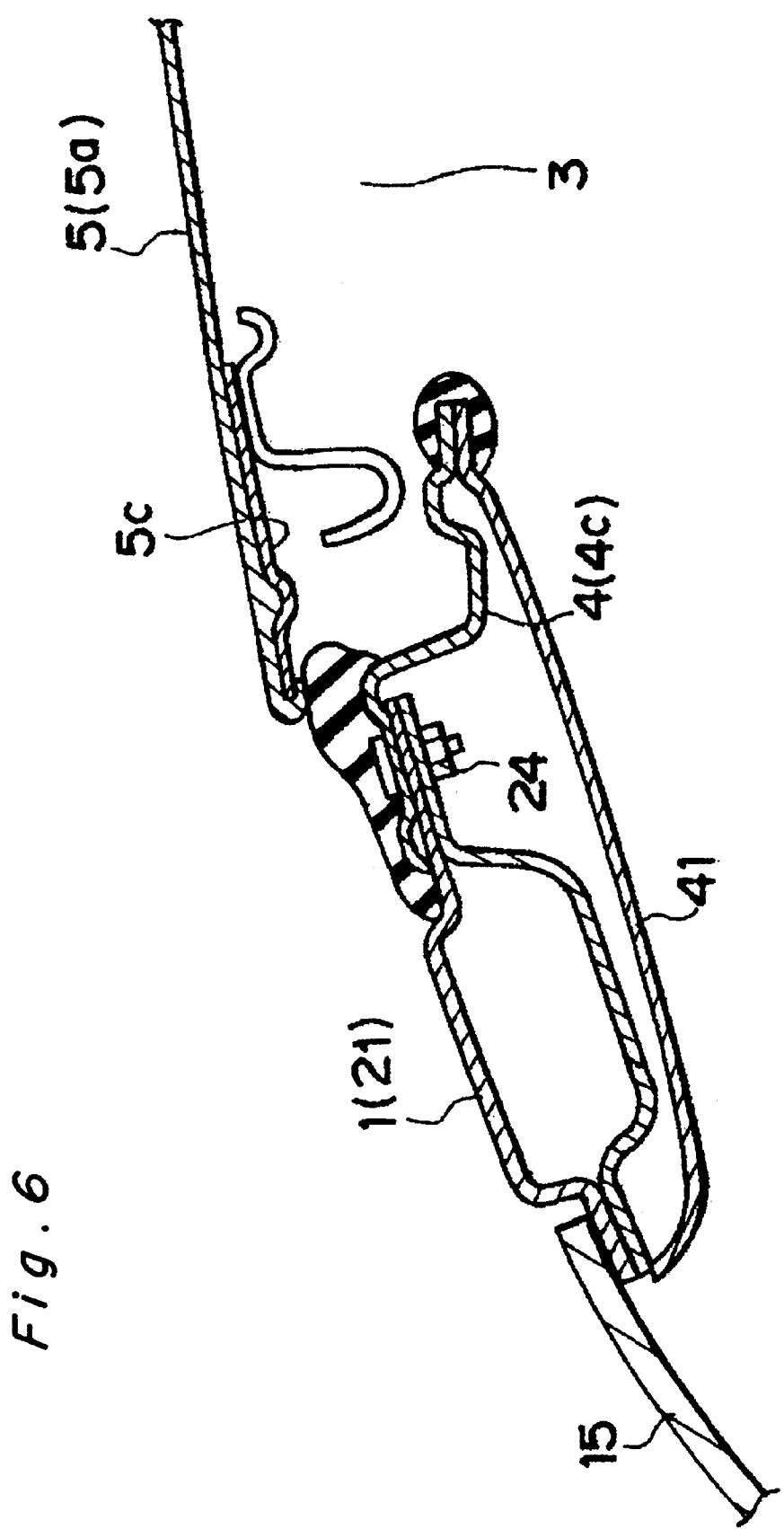
FIG. 6 is a section view through line X6—X6 in FIG. 4.
Figure 7:
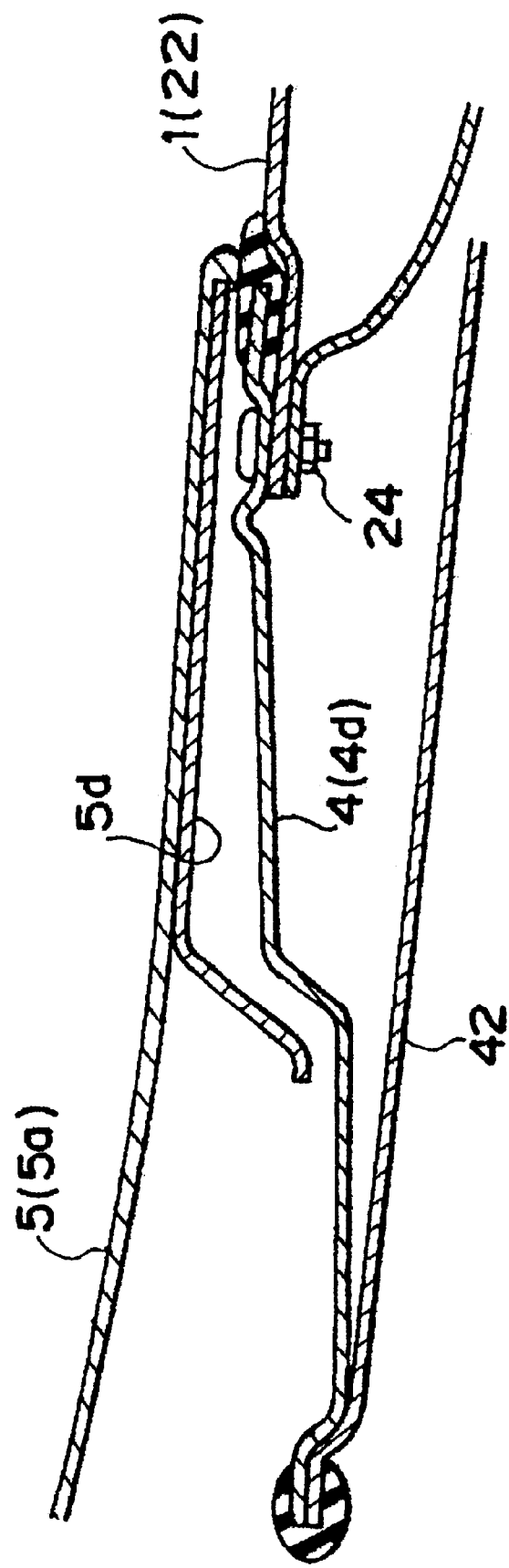
FIG. 7 is a section view through line X7—X7 in FIG. 4.

This exemplary embodiment of the present invention is described in further detail below starting with FIG. 4 and FIG. 5. Shown in these figures are the A pillar 11, which is forward of the center pillar 2 (B pillar), and the C pillar 12, which is to the rear of the center pillar 2. Front opening 13 of the side body is where the front side door for front seats of the vehicle opens and closes, and rear opening 14 of the side body is where the rear side door for rear seats of the vehicle opens and closes. Also shown are the front windshield 15 and rear door 17 having rear window 16. Front header 21 (see FIG. 6) is the front end of roof 1, rear header 22 (see FIG. 7) is the rear end of the roof 1, and side rails 23 form the right and left sides of the roof 1 (see FIG. 8 and FIG. 9).

The frame 4 is mounted to roof 1 with fasteners 24 removably securing the edge of frame 4 to roof 1. As shown in FIG. 4, four mounting brackets 31 located on the sides at the corners front and back further fasten frame 4 to roof 1 from inside the passenger cabin. The frame 4 is yet further fastened to the center pillar 2 by means of the reinforcements 6. The frame 4 is thus solidly fastened to the body.

Figure 8:
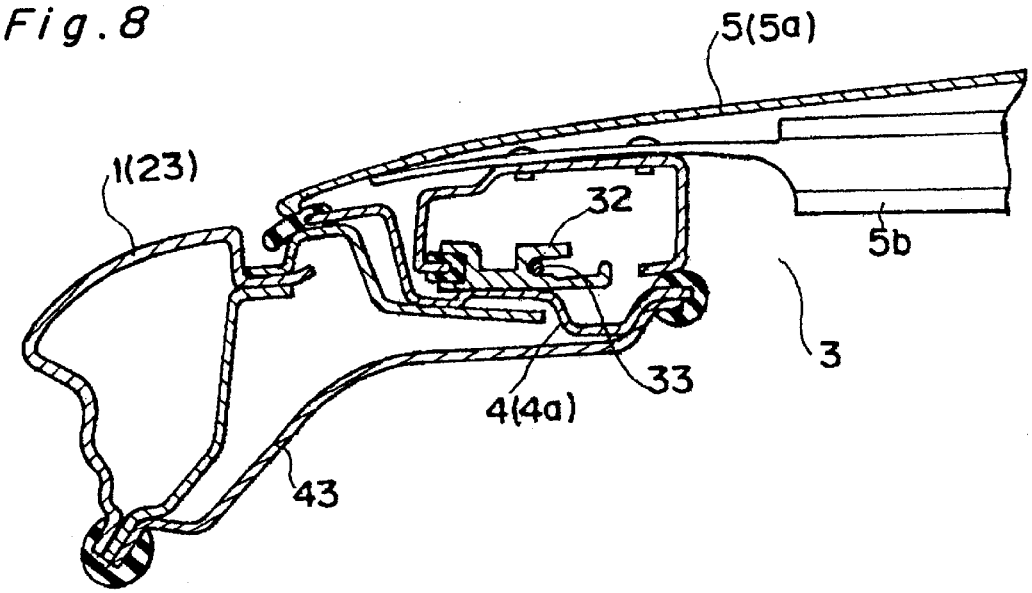
FIG. 8 is a section view through line X8—X8 in FIG. 4.

The cover 5 is preinstalled to the frame 4, forming a cover unit such that cover 5 is installed to the roof 1 by way of intervening frame 4. As shown in FIG. 8, a guide 32 is disposed to the right and left side members 4a of frame 4. The front end of cover 5 is supported so that it can slide longitudinally to the roof guided by guide 32. The cover 5 can be opened or closed by a motor (not shown in the figure), for example, installed at the back of roof 1 pulling on a wire 33 so as to pull the front end of cover 5 forward and closed or back and open.

Figure 9:
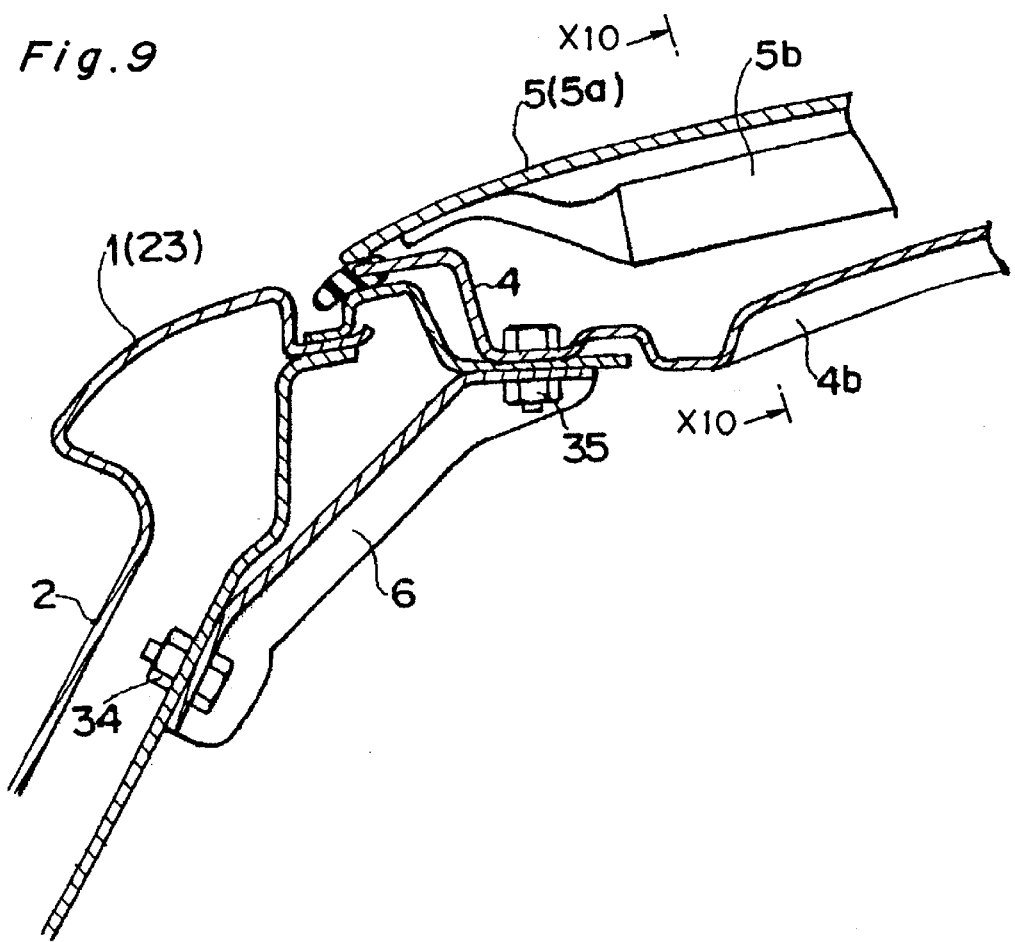
FIG. 9 is a section view through line X9—X9 in FIG. 4.
Figure 10:
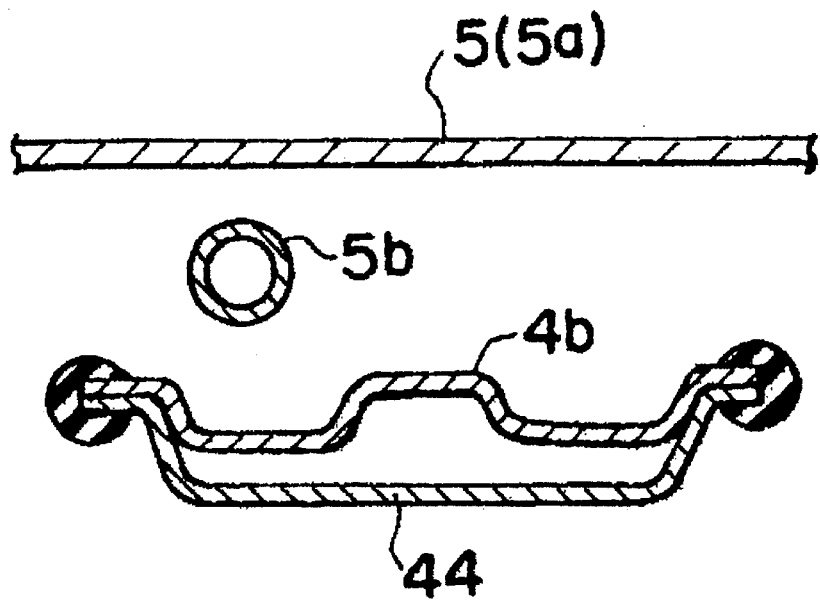
FIG. 10 is a section view through line X10—X10 in FIG. 9.

The reinforcing cross member 4b, and the connection between the reinforcing cross member 4b, center pillar 2, and reinforcement 6, are shown in detail in FIG. 9 and FIG. 10.

As shown in FIG. 10, reinforcing cross member 4b is manufactured by shaping flat steel sheet, for example, to the desired shape. Because the reinforcing cross member 4b therefore is not a closed section, it is shaped with a ridge and valley orthogonal to the longitudinal direction of the vehicle as shown in FIG. 10 to increase its strength and rigidity.

As shown in FIG. 9, reinforcement 6 is similarly manufactured by bending flat steel sheet, for example. One end of the reinforcement 6 is fastened by means of a fastener 34 to the inner panel of center pillar 2 near the side roof rail 23. The other end of reinforcement 6 is fastened to roof 1 and frame 4 by means of fastener 35 holding the three layers together. It will be obvious from the preceding description that the location of this fastener 35 is in line with reinforcing cross member 4b, and reinforcement 6 can also be directly fastened to reinforcing cross member 4b. Note that various trim pieces 41 to 44 are also shown in FIGS. 6, 7, 8, and 10.

Figure 11:
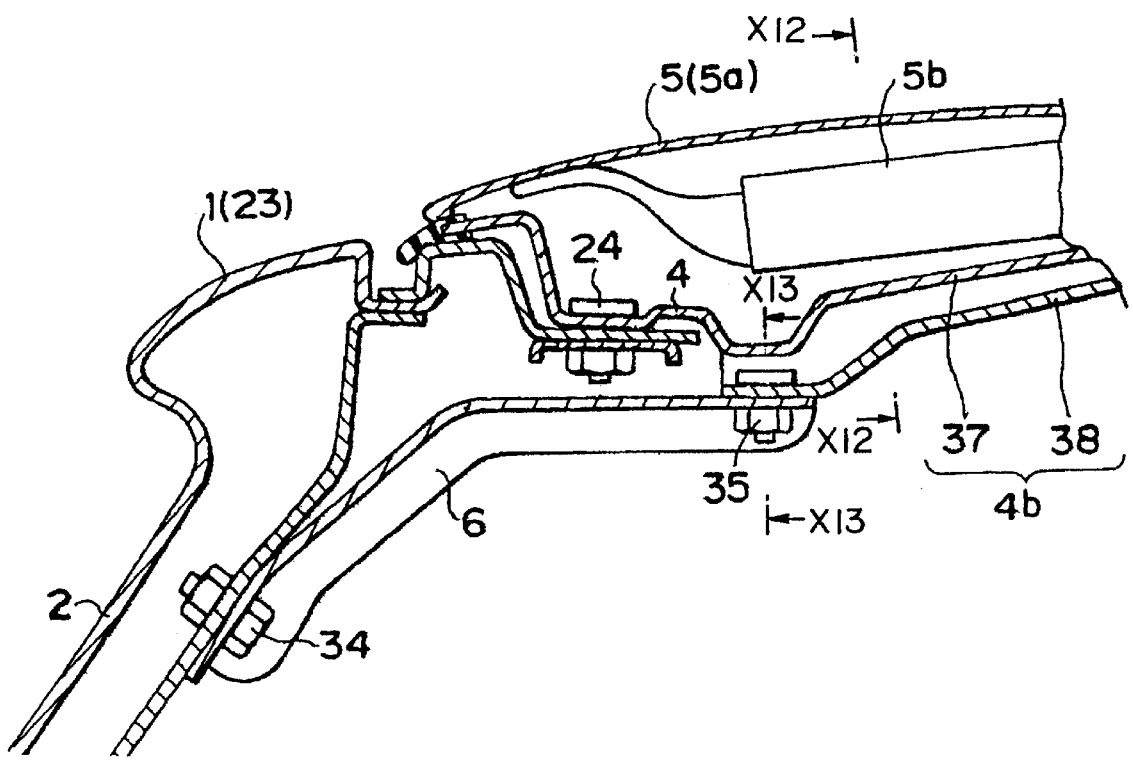
FIG. 11 is a section view corresponding to FIG. 9 for an alternative embodiment of the present invention.
Figure 12:
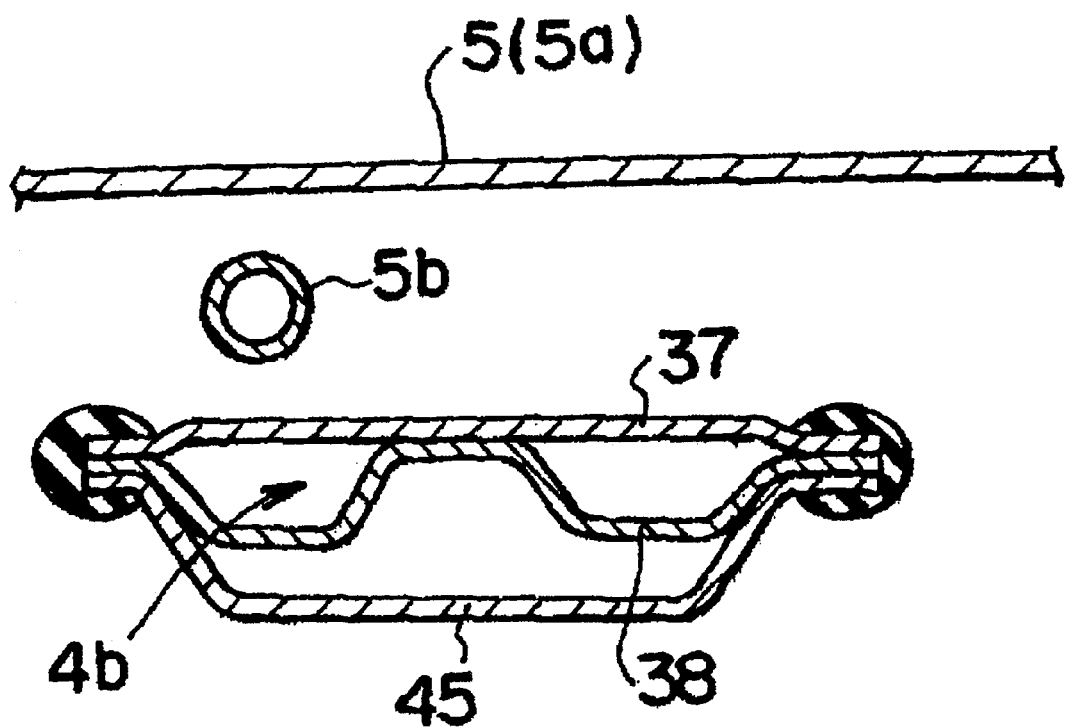
FIG. 12 is a section view through line X12—X12 in FIG. 11.
Figure 13:
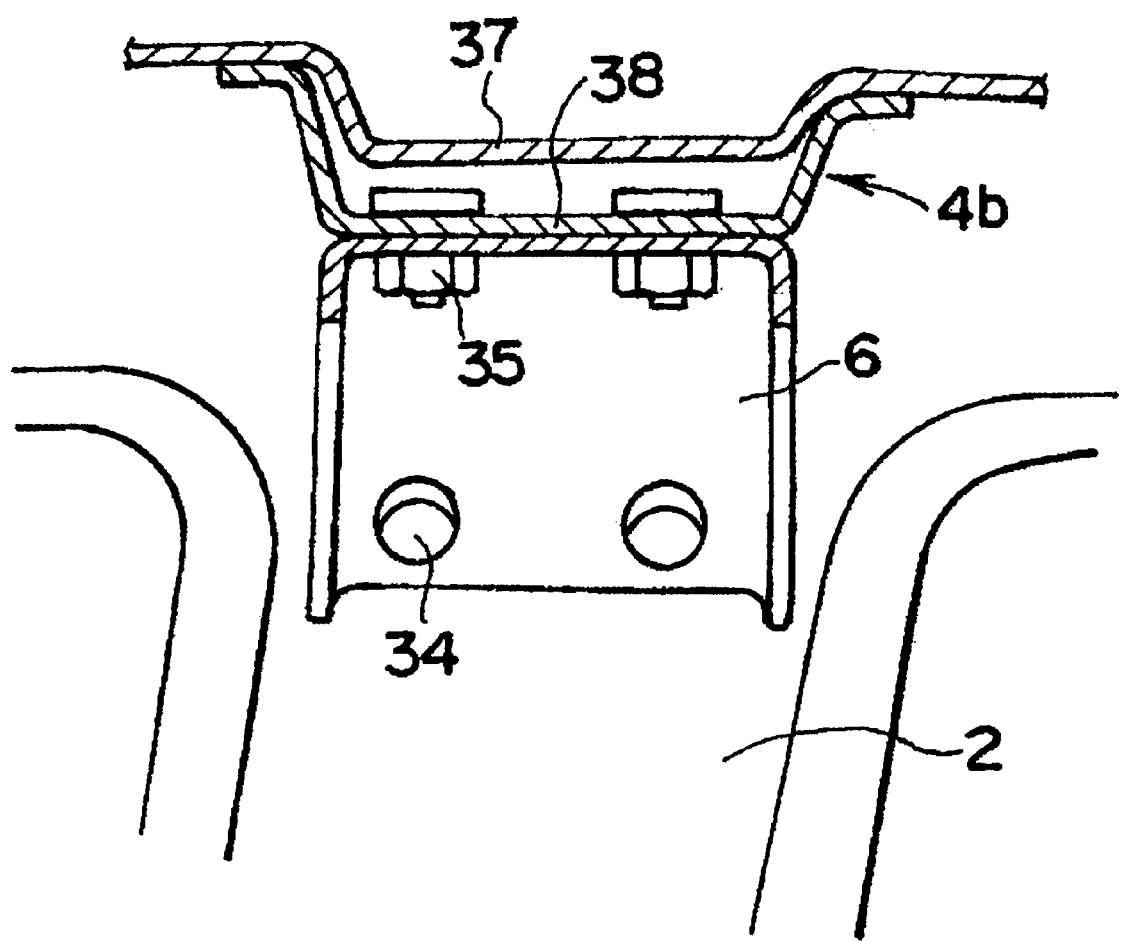
FIG. 13 is a section view through line X13—X13 in FIG. 11.

An alternative configuration of the present invention is shown in FIGS. 11 to 13, which show variations of the components shown in FIG. 9 and FIG. 10. In this exemplary embodiment the reinforcing cross member 4b has a closed section formed by conjoining an upper panel 37 and a lower panel 38. Note that either upper panel 37 or lower panel 38 is formed integrally with frame 4. Furthermore, reinforcement 6 is fastened to the lower panel 38 in this alternative embodiment. Note that a trim piece 45 is also shown in FIG. 12.

It will be obvious to one with ordinary skill in the related art that the preceding description of the invention is merely illustrative, and the invention shall not be so limited. For example, the entire cover 5 can be made from hardboard. Further alternatively, the cover 5 can be split in front and back parts at the reinforcing cross member 4b.

Furthermore, the center pillar 2 at a longitudinal position matching the reinforcing cross member 4b (where the reinforcement 6 connects) can be selected from the pillars located by the front pillar and back pillar closest to the longitudinal center of the roof opening 3.

Furthermore, constructions having reinforcing cross member 4b but not using reinforcement 6 are also possible.

Yet further, constructions having reinforcement 6 but not using reinforcing cross member 4b are also possible.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An upper body structure for a vehicle having in the vehicle roof a roof opening that can be opened and closed by a cover member, comprising:

a frame member disposed to the roof so as to frame the roof opening and support the cover member, said frame member comprising a reinforcing cross member extending widthwise to the vehicle body and interconnecting right and left frame side members, which extend longitudinally with respect to the vehicle body;

said reinforcing cross member comprising an upper panel and a lower panel and a closed section formed by conjoining said upper panel and said lower panel, and a trim panel covering a vehicle cabin side of said reinforcing cross member;

the cover member being of canvas type which is a soft top cover member having a cover material, and a plurality of ribs extending widthwise with respect to the vehicle body, spaced with a gap therebetween longitudinally with respect to the vehicle body, and connected to the cover material;

wherein at least one of said ribs is positioned in the longitudinal direction of the vehicle body so as to overlap the reinforcing cross member when the roof opening is completely closed by the cover member, and an opening enclosed by four sides of said frame member is smaller than the roof opening, and outside edges of said four sides of said frame member are larger than the roof opening.

2. An upper body structure for a vehicle as described in claim 1 wherein the frame member and center pillar of the body are conjoined by means of a reinforcement, the location of the reinforcing cross member, the location of the center pillar, and the location of the reinforcement, being substantially at the same position in the longitudinal direction of the vehicle body.

3. An upper body structure for a vehicle as described in claim 1, wherein the cover material is weakly transparent to visible light.

* * * * *